United States Patent [19]
Draut

[11] 3,838,987
[45] Oct. 1, 1974

[54] METHOD FOR AXIALLY ADJUSTING THE POSITION OF A SHAFT

[75] Inventor: Robert L. Draut, Cincinnati, Ohio

[73] Assignee: Allis-Chalmers Corporation, Milwaukee, Wis.

[22] Filed: July 2, 1973

[21] Appl. No.: 375,823

Related U.S. Application Data
[62] Division of Ser. No. 260,632, June 7, 1972, abandoned.

[52] U.S. Cl.............. 29/426, 29/463, 29/526, 403/312
[51] Int. Cl............................................. B23p 19/00
[58] Field of Search...... 29/426, 526, 463; 403/312, 403/300, 313; 287/DIG. 7

[56] References Cited
UNITED STATES PATENTS

| | | | |
|---|---|---|---|
| 155,121 | 9/1874 | Stuart | 403/312 |
| 157,427 | 12/1874 | Stuart | 403/312 |
| 502,686 | 8/1893 | Tilton | 403/300 |
| 1,186,325 | 6/1916 | Metzger | 287/DIG. 7 UX |
| 1,217,804 | 2/1917 | Metzger | 287/DIG. 7 UX |
| 1,442,223 | 1/1923 | Knebusch | 287/DIG. 7 UX |
| 2,869,910 | 1/1959 | Fisher et al. | 287/DIG. 7 UX |

FOREIGN PATENTS OR APPLICATIONS

| | | | |
|---|---|---|---|
| 417,156 | 8/1925 | Germany | 287/DIG. 7 |

*Primary Examiner*—Charlie T. Moon
*Attorney, Agent, or Firm*—John P. Hines

[57] ABSTRACT

The method utilizes a rotary shaft coupling for connecting two axially aligned shafts having a connecting ring between the shafts and the coupling to permit selective relative axial adjustment of the shafts. The connecting ring which is L-shaped in cross section, fits into grooves of different widths provided in the outer surface of the shafts and the inner surface of the coupling. By rotating the ring 180° about a diameter axis the relative position between the shaft and the coupling is adjusted.

1 Claim, 5 Drawing Figures

PATENTED OCT 1 1974 3,838,987

METHOD FOR AXIALLY ADJUSTING THE POSITION OF A SHAFT

This is a division, of application Ser. No. 260,632 filed June 7, 1972, now abandoned.

This invention pertains in general to shaft couplings, and more particularly to such a method that permits selective relative axial movement between the shafts.

There are numerous applications which require connecting two rotating shafts for the transmission of power and wherein axial adjustment of the shafts is required. This invention contemplates an extremely inexpensive and simplified method to provide such axial adjustment.

It is therefore the general object of this invention to provide a method which permits selective relative adjustment of connected shafts.

A more specific object is to provide a method of the above described type having an L-shaped connecting ring which is rotated 180° about a diameter axis to provide the necessary axial adjustment.

These and other objects of the subject invention will become more fully apparent as the following description is read in light of the attached drawing wherein.

Figure 2:
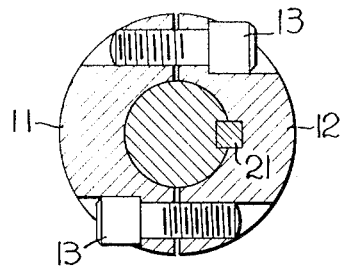
FIG. 2 is a cross section taken along the lines II—II of FIG. 1.

Referring to the drawing, the coupling is constructed of two half sections identified as 11 and 12. The coupling half sections may be releasably connected together in any conventional manner, and are herein shown releasably connected by means of four cap screws each identified as 13. When connected together in the operative manner, the half sections of the casing define a longitudinally extending shaft bore 14.

The shaft bore is provided with a pair of axially disposed keyway slots 16 and 17. A pair of shafts 18 and 19 are received in opposite ends of the coupling bore 14. Each shaft is also provided with mating keyway slot in which is received key 21 to provide a rotational connection between the shafts and the coupling.

Each shaft is also provided with an annular groove. These shaft grooves are selectively alignable with annular grooves in the interior surface of the casing halves which open into the bore 14. Rings 22 and 23, preferably split, which are L-shaped in cross section, are contained in the grooves to prohibit relative axial movement between the shafts and the coupling.

In the preferred embodiment the widths 24 and 26 of each of the legs of the L-shaped ring 22 are equal to one another and equal to the width of the groove in the associated shaft 18. The lengths 27 and 28 of each leg of the ring 22 are equal to one another and equal to the width of the groove in the associated end of the casing. However, the widths 24 and 26 are not equal to the respective lengths 27 and 28.

Figure 1:
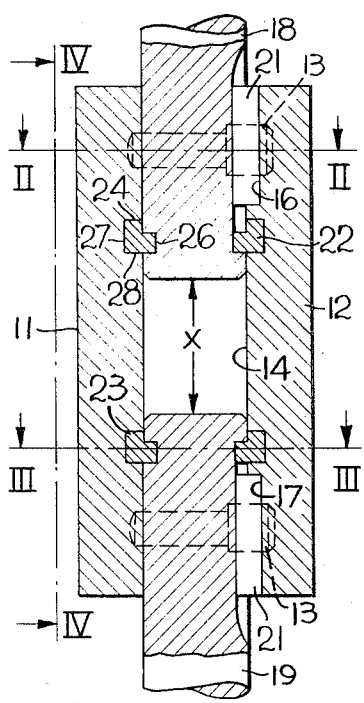
FIG. 1 is a cross sectional view of a shaft coupling constructed in accordance with the invention and showing one adjusted position of the coupling.
Figure 5:
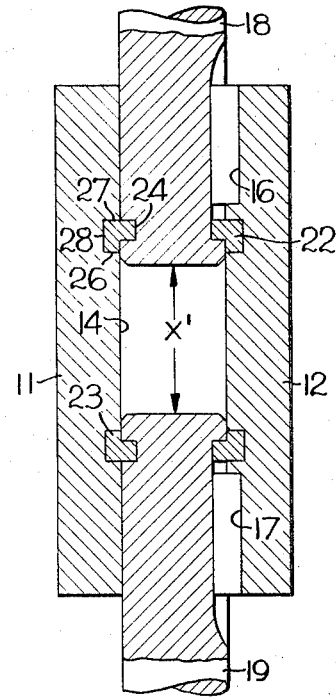
FIG. 5 is a cross section similar to FIG. 1 showing the coupling in a different, adjusted position.
Figure 4:
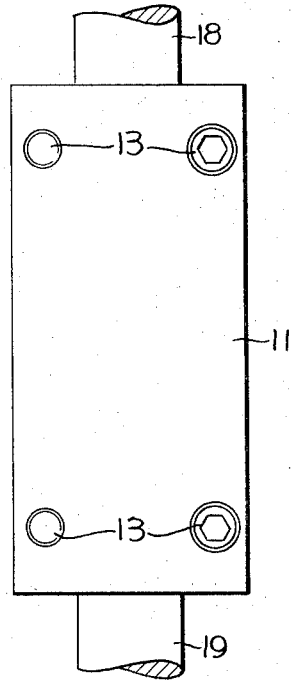
FIG. 4 is a side view taken along the lines IV—IV of FIG. 1.
Figure 3:
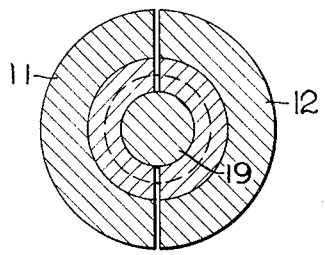
FIG. 3 is a cross section taken along the lines III—III of FIG. 1.

Adjustment of the relative axial positions of the shafts is accomplished quite easily. Starting with the rings 22 and 23 in the position as shown in FIG. 1, the coupling half sections are removed and the ring 22 is rotated 180° about an axis which is a diameter of the ring to the position shown in FIG. 5. This causes the space X between the shafts to be increased. If it is desired to decrease the space X between the shafts, the ring 23 would be rotated 180° while the ring 22 would remain in the position shown in FIG. 1.

Although it is desired, for the sake of simplicity, to construct the rings with the lengths being equal to one another and the widths being equal to one another, this is not absolutely necessary. If more precise and varied adjustment is necessary, shims may be used. As an example, the length 27 as shown in FIG. 1, could be less than the axial length of the casing groove. The shims could then be placed all or partially on one or the other side of the ring. Naturally it would be necessary to use all of the shims at all times; however, the adjustment would depend on which side of the ring the most shims are placed.

The embodiments of the invention in which an exclusive property or privilege is claimed are defined as follows:

1. The method of adjusting the relative axial position between a shaft having an annular groove of one axial dimension and a split shaft coupling comprising sections releasably connected together about said shaft including an annular groove of a different axial dimension than said shaft groove alignable with said shaft groove and including a split ring of L-shape in cross section contained in said aligned grooves to hold said shaft and coupling against relative axial movement comprising the steps of:
   a. removing said coupling sections from about said shaft;
   b. removing said split ring from said shaft groove;
   c. rotating said split ring 180° about a diameter of said ring;
   d. reinserting said split ring in the shaft groove in its rotated position; and
   e. attaching said coupling sections about said shaft with the split ring also in the coupling groove, whereby the relative axial position of said shaft and said coupling has been changed a distance equal to the difference of the axial dimensions of said grooves.

* * * * *